United States Patent [19]
Reed

[11] Patent Number: 5,802,541
[45] Date of Patent: Sep. 1, 1998

[54] METHOD AND APPARATUS IN A DATA PROCESSING SYSTEM FOR USING CHIP SELECTS TO PERFORM A MEMORY MANAGEMENT FUNCTION

[75] Inventor: Wendy Reed, Austin, Tex.

[73] Assignee: Motorola, Inc., Schaumburg, Ill.

[21] Appl. No.: 608,388

[22] Filed: Feb. 28, 1996

[51] Int. Cl.[6] .................. G06F 12/00; G11C 11/407; G11C 11/413; H03K 19/0175

[52] U.S. Cl. .................. 711/1; 711/147; 711/170; 711/209; 365/230.06; 326/105

[58] Field of Search .................. 395/405, 432, 395/480, 497.04, 474, 419, 401; 365/230.06; 711/5, 105, 153, 173, 209, 1, 170, 147; 326/105

[56] References Cited

U.S. PATENT DOCUMENTS

| | | | |
|---|---|---|---|
| 4,800,489 | 1/1989 | Moyer et al. | 395/209 |
| 5,151,986 | 9/1992 | Langan et al. | 395/281 |
| 5,448,744 | 9/1995 | Eifert et al. | 395/800 |
| 5,483,660 | 1/1996 | Yishay et al. | 395/280 |
| 5,511,182 | 4/1996 | Le et al. | 395/559 |
| 5,530,818 | 6/1996 | Tagawa | 395/1 |
| 5,559,992 | 9/1996 | Stutz et al. | 395/163 |
| 5,623,664 | 4/1997 | Calvert et al. | 395/651 |
| 5,638,520 | 6/1997 | Moyer | 395/308 |
| 5,649,159 | 7/1997 | Le et al. | 395/163 |
| 5,651,138 | 7/1997 | Le et al. | 395/169 |

*Primary Examiner*—Glenn Gossage
*Attorney, Agent, or Firm*—Susan C. Hill

[57] ABSTRACT

A data processing system (10) including a chip select circuit (40) which allows flexible attribute protection, and a method for providing a plurality of chip select signals in the data processing system are disclosed. Each of two or more decoders (42, 48) determines whether a bus cycle address is within a programmable region and matches one or more programmable attributes, and if so activates a corresponding match signal. A logical operation circuit (60) then selectively causes a chip select signal (72) to be activated in response to a logical operation performed on the match signals. In one embodiment, the logical operation circuit (60) may cause the chip select signal (72) to be activated if either of two match signals (47, 53) is activated, allowing for example the same region of memory to be accessed from two address spaces using the same chip select signal (72).

27 Claims, 2 Drawing Sheets

METHOD AND APPARATUS IN A DATA PROCESSING SYSTEM FOR USING CHIP SELECTS TO PERFORM A MEMORY MANAGEMENT FUNCTION

REFERENCE TO RELATED APPLICATIONS

The present application is related to the following U.S. patent applications:

"Data Processor with a Multi-Level Protection Mechanism, Multi-Level Protection Circuit, and Method Therefor", by Chinh H. Le, having Ser. No. 08/445,817, filed May 22, 1995, now U.S. Pat. No. 5,649,159, and assigned to the assignee hereof;

"Method And Apparatus In A Data Processing System For Selectively Inserting Bus Cycle Idle Time", by Oded Yishay et al, having Ser. No. 08/158,575, filed Nov. 29, 1993, now U.S. Pat. No. 5,664,168, and assigned to the assignee hereof; and "Method And Apparatus For Distributing Bus Loading In A Data Processing System", by William C. Moyer, having Ser. No. 08/414,473, filed Mar. 31, 1995, now U.S. Pat. No. 5,638,520, and assigned to the assignee hereof.

FIELD OF THE INVENTION

This invention relates generally to data processors, and more particularly, to chip select logic circuits for integrated circuit microprocessors and microcomputers.

BACKGROUND OF THE INVENTION

Integrated circuit microprocessors must, in many cases, be connected with other integrated circuit devices in order to provide certain functions. Examples of such external devices include memories, serial interface adaptors, analog-to-digital converters and many others. In most cases, each such external device will require external control signals in order for the device to be appropriately activated when accessed by the microprocessor. For example, a static random access memory (SRAM) integrated circuit requires the chip enable, output enable, and write enable control signals to control read and write accesses. The timing requirements of these signals differ somewhat between commercially available devices. For example, some SRAMs provide output data asynchronously with respect to the output enable signal, whereas other SRAMs sample output enable and provide output data synchronously with a clock signal.

Typically, a designer of a system using a microprocessor and other integrated circuits will use "glue logic" to generate the required chip select signals from the address and bus control signals produced by the microprocessor itself. This extra logic adds significantly to the cost of the system being designed and may degrade performance, and therefore is highly undesirable.

The 80186 (also referred to as the iAPX 186), available from the Intel Corporation of Santa Clara, Calif., is an integrated circuit microprocessor which has internal logic for generating chip select signals. The chip select logic has limited ability to program the address range for which each of the seven possible chip selects is active and can programmably insert wait states into the bus cycles for which each chip select is active. In addition, some of the chip selects may be programmed to be active in only the memory or I/O address spaces of the microprocessor.

Another example of an integrated circuit microprocessor with on-board chip select logic is that disclosed by John A. Langan and James M. Sibigtroth in U.S. Pat. No. 5,151,986, issued Sep. 29, 1992. The disclosed chip select logic includes a control register by means of which the timing, polarity and number of wait states can be individually programmed for each of several chip select outputs.

An integrated circuit microprocessor with a highly flexible on-board chip select logic is taught by James B. Eifert et al. in U.S. Pat. No. 5,448,744, issued Sep. 5, 1995. The chip select logic taught by Eifert et al. provides a great deal of flexibility by allowing the chip select signal to be activated conditionally based on whether an attribute of an access cycle, such as whether the cycle is a read or a write cycle, matches a programmable attribute. This mechanism allows, for example, a program to be write protected by keeping the chip select signal inactive if the program erroneously attempts a write access to the area in memory where the program is stored.

Some highly integrated systems use only one or only a small number of memory chips. Chinh H. Le teaches in copending application Ser. No. 08/445,817, now U.S. Pat. No. 5,649,159, a chip select circuit capable of supporting overlapping chip select regions. This chip select circuit allows a region to be nested within another region having different access protection characteristics. So, for example, a write protected region may be contained within or overlapping with a region which is read/write. If an input address is within both the smaller, write protected region and the larger read/write region, then the attributes of the write protected region take priority over the attributes of the lower priority read/write region.

One of the attributes which may be checked for access privileges is the address space. In the M68000 family of microprocessors manufactured by Motorola, Inc., Austin, Tex. a three-bit function code indicates which of five address spaces is being accessed. These five address spaces are supervisor program, supervisor data, user program, user data, and central processing unit (CPU) space. Other microprocessor families also indicate similar types of address spaces, which may then be used by a memory management unit to implement segment translation.

Despite these flexible mechanisms, however, for some applications additional flexibility is required. It may be necessary in some applications to allow accesses to a single memory chip from any of two or more address spaces. For example, an operating system kernel may need to allow code accesses by either a supervisor or user to the same range of addresses. Alternatively, it may be desirable for different addresses in two different address spaces to access the same memory chip. Also it may be desirable to allow accesses from different address spaces with different attributes, for example a supervisor read/write region overlapping a user read only region. No known chip select mechanisms allow this flexibility.

What is needed, then, is a chip select circuit for a data processing system which allows accesses to the same memory chip using a single chip select signal under a variety of different attributes. The present invention provides such a mechanism, whose features and advantages will be more clearly understood from the following detailed description taken in conjunction with the accompanying drawings.

DESCRIPTION OF THE PREFERRED EMBODIMENT

According to the present invention, a data processing system allows accesses to the same external memory chip, by activating a single chip select signal, under a variety of different conditions. To achieve this result the chip select circuit includes two or more decoders, each programmed to recognize addresses within a particular region and having a particular attribute. Each decoder activates a match signal if the current access is within its programmed region and has its programmed attributes. A logical operation circuit then performs a logic function on the two or more match signals in generating the chip select signal. For example the logical operation may be a logical "OR". This logic function allows, for example, accesses to the same range of addresses from two different address spaces, such as supervisor program and user program. Another example of a possible logical operation would be a logical "(A) AND (NOT B)". This logic function would prevent accesses to a particular subregion within a larger region. In one embodiment, the number of regions which may affect the same chip select signal is flexibly chosen through a decode assignment register. Note that any number of decode circuits may be assigned to a particular chip select.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

Description of the Figures

Figure 1:
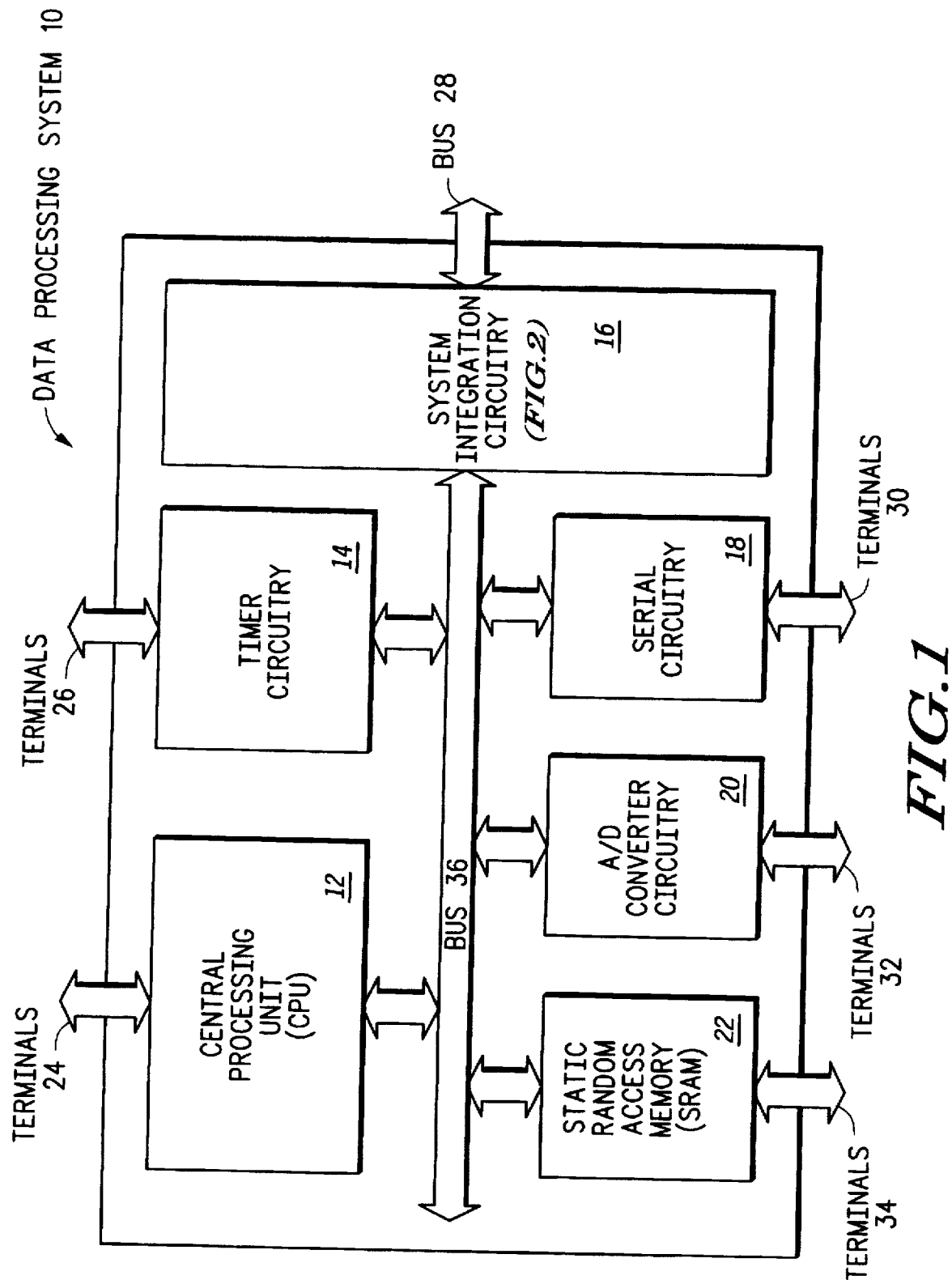
FIG. 1 illustrates, in block diagram form, a data processing system 10 in accordance with one embodiment of the present invention.
Figure 2:
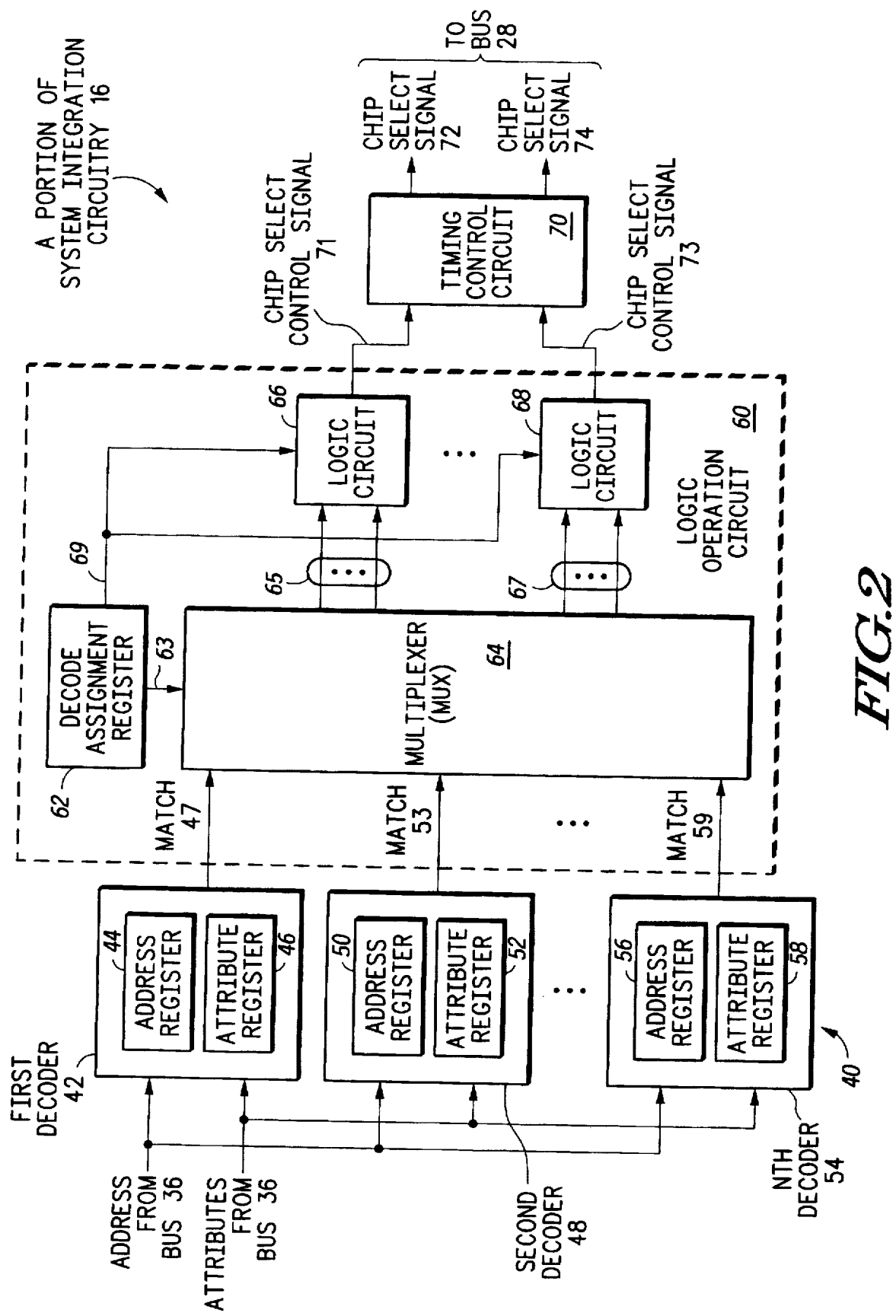
FIG. 2 illustrates, in block diagram form, a portion of system integration circuitry 16 of FIG. 1 in accordance with one embodiment of the present invention.

The present invention can be more fully understood with reference to FIGS. 1 and 2. FIG. 1 illustrates a data processing system 10 that includes a central processing unit (CPU) 12, timer circuitry 14, system integration circuitry 16, serial circuitry 18, analog/digital (A/D) converter circuitry 20, and static random access memory (SRAM) 22, which are all bi-directionally coupled to bus 36. CPU 12 is optionally coupled external to data processing system 10 by way of integrated circuit terminals 24. Timer 14 is coupled external to data processing system 10 by way of integrated circuit terminals 26.

System integration circuitry 16 is coupled external to data processing system 10 by way of integrated circuit terminals 28. Serial circuitry 18 is coupled external to data processing system 10 by way of integrated circuit terminals 30. A/D converter circuitry 20 is coupled external to data processing system 10 by way of integrated circuit terminals 32. SRAM 22 is optionally coupled external to data processing system 10 by way of one or more integrated circuit terminals 34. In one embodiment, data processing system 10 is a microcomputer formed on a single integrated circuit. In one embodiment of the present invention, integrated circuit terminals 24, 26, 28, 30, 32, and 34 are integrated circuit bonding pads. In another embodiment of the present invention, integrated circuit terminals 24, 26, 28, 30, 32, and 34 are integrated circuit pins.

FIG. 2 illustrates one embodiment of a portion of system integration circuitry 16 (see FIG. 1). FIG. 2 includes a first decoder 42, a second decoder 48, and an Nth decoder 54. Each one of decoders 42, 48, and 54 receives a plurality of address signals from bus 36. In addition, each of decoders 42, 48, and 54 receives a plurality of attribute signals from bus 36. First decoder circuit 42 provides a match signal 47 to multiplexer (MUX) circuit 64. Second decoder circuit 48 provides a match signal 53 to multiplexer 64. Note that the terms "logical operation circuit 60" and "logic operation circuit 60" have been used interchangeably herein. Nth decoder circuit 54 provides a match signal 59 to multiplexer 64. Multiplexer 64 also receives at least one control signal 63 from decode assignment register 62. Multiplexer 64 provides any number of match signals 47, 53, and 59 to logic circuit 66 by way of conductors 65. Multiplexer 64 provides any number of match signals 47, 53, and 59 to logic circuit 68 by way of conductors 67. Decode assignment register 62 provides at least one control signal 69 to logic circuit 66 and logic circuit 68. Logic circuit 66 provides a chip select control signal 71 to timing control circuit 70. Timing control circuit 70 provides a chip select signal 72 and a chip select signal 74 to bus 28. Logical operation circuit 60 receives match signals 47, 53, and 59 from decoders 42, 48, and 54. Chip select circuit 40 includes decoders 42, 48, and 54 along with logical operation circuit 60.

Discussion of Operation and Alternate Embodiments

The detailed operation of one embodiment of the present invention will now be discussed. As an example, referring to FIG. 2, if a user desires to use chip select signal 72 to select a memory (not shown) which is external to data processing system 10, the user must program decode assignment register 62 to select which decode circuits 42, 48, and 54 will be assigned to chip select signal 72. If the external memory (not shown) includes a first address range which is used for supervisor program space, and a second address range which is used for user program space, the user will program decode assignment register 62 to select two decode circuits (e.g. 42 and 48) to be assigned to chip select signal 72.

The user must then program decode circuit 42 by programming address register 44 with the first address range and by programming attribute register 46 with supervisor space and program space. In addition, the user must also program decode circuit 48 by programming address register 50 with the second address range and by programming attribute register 52 with user space and program space. The user must also program decode assignment register 62 to select an OR function so that logic circuit 66 will perform a logical OR operation on match signal 47 and match signal 53. Thus, if either match signal 47 or match signal 53 is asserted (i.e. a match occurred), then chip select signal 72 is asserted at the proper time. Consequently, chip select signal 72 is asserted when either an access is made to the first address range having attributes of supervisor space and program space, or when an access is made to the second address range having attributes of user space and program space.

Match signal 47 will be asserted (i.e. a match occurs) when the address and attributes of the present bus cycle (e.g. an access to the external memory) match the address range and attributes programmed into address register 44 and attribute register 46. Likewise, match signal 53 will be asserted (i.e. a match occurs) when the address and attributes of the present bus cycle match the address range and attributes programmed into address register 50 and attribute register 52.

Referring to FIG. 2, alternate embodiments of the present invention may use any number of decoders 42, 48, and 54.

Multiplexer 64 may be an N:M multiplexer, where N and M are positive integers, and N may be greater than or equal to M, or M may be greater than or equal to N. Alternate embodiments of the present invention may have a logic circuit (e.g. 66, 68) for each chip select signal (e.g. 72, 74). Yet other embodiments of the present invention may combine the functionality of logic circuits 66 and 68 into one or a few global logic circuits that are shared by all of the chip selects or a portion of the chip selects.

Decode assignment register 62 may be implemented using one or multiple registers. Register 62 may have one set of bit fields for each chip select signal or the control information for all chip selects may be encoded together in one or more bit fields. Register 62 may be user programmable either using a mask layer during manufacturing of data processing system 10 or may be user programmable by way of write accesses across bus 36 or bus 28 (FIG. 1). For example, CPU 12 may program decoded assignment register 62 by performing one or more write accesses to decode assignment register 62 by way of bus 36. Alternately, decode assignment register 62 may be user programmable by way of one or more write accesses from an external source (not shown) by way of bus 28.

In one embodiment of the present invention, each one of address registers 44, 50, and 56 define a contiguous block of memory having an upper bound and a lower bound where the upper and lower bounds may be user programmable. There are a wide variety of ways to define this contiguous block of memory. Each one of address registers 44, 50, and 56 defines one contiguous block. In one embodiment of the present invention, the address decode performed in decoders 42, 48, and 54 actually includes two stages of address decode.

For purposes of illustration, the operation of first decoder 42 will now be described. The first level of decode involves comparing the most significant address signals from bus 36 to selected address bits stored in address register 44. The second level of decode involves comparing selected predetermined address signals from bus 36 to other address bits stored in address register 44. If both levels of decode compare produce a match, then first decoder 42 has determined that the address provided from bus 36 is located within the contiguous block of memory defined by address register 44. Note that in yet another alternate embodiment of the present invention, if the first level of decode masks selected ones of the most significant address bits, then address register 44 may actually be used to select multiple non-contiguous blocks of memory within the total address range defined by the address signals from bus 36.

In addition to the comparison performed between bits stored in address register 44 and address signals from bus 36, first decoder 42 also performs a comparison between selected bits in attribute register 46 and selected control signals defining attributes from bus 36. In one embodiment of the present invention, attribute register 46 includes bits that define supervisor and user space, bits that define data and program space, and bits that define writeable space and readable space. Alternate embodiments of the present invention may include attribute bits in attribute register 46 that check for other attributes. In one embodiment of the present invention, a single bit in attribute register 46 is used to select between supervisor and user space, a separate bit to select between data and program space, and yet another bit is used to select between readable space and writeable space. However, alternate embodiments of the present invention may use any encoding of these bits.

Still referring to attribute register 46, note that in one embodiment a separate bit may be used for program space and a separate bit may be used for data space. In addition, a separate bit may be used for supervisor space and a separate bit may be used for user space. Instead of using a read/write bit, a read-only bit may be used in order to allow for write protection of an address space.

Note that match signal space 47 is only asserted if address register 44 matches with the selected address signals from bus 36 and attribute register 46 matches with the selected attribute signals from bus 36. Second decoder circuit 48 and Nth decoder circuit 54 function in the same manner as first decoder circuit 42, however, second decoder circuit 48 may programmed to select its own address range and set of attributes, and Nth decoder circuit 54 may be programmed to select its own address range and set of attributes.

Decode assignment register 62 provides control signal 63 to multiplexer 64. These control signals determine which one or ones, if any, of match signals 47, 53, and 59 are assigned to chip select signal 72. In addition, decode assignment register 62 determines which one or ones, if any, of match signals 47,53, and 59 are assigned to chip select signal 74. As an example, match signal 47 and match signal 53 may be assigned by decode assignment register 62 to chip select signal 72. In this example, decode assignment register 62 routes both match signal 47 and match signal 53 to logic circuit 66. Logic circuit 66 then performs a predetermined Boolean operation using match signal 47 and match signal 53 as inputs. In one embodiment of the present invention, logic circuit 66 performs a simple Boolean ORing function on match signal 47 and match signal 53. Thus, if either match signal 47 or match signal 53 are asserted, chip select control signal 71 will be asserted. Timing control circuit 70 will then determine the proper time to assert chip select signal 72 external to the data processing system by way of bus 28.

In an alternate embodiment of the present invention, decode assignment register 62 may select a Boolean function for logic circuit 66 other than a simple, logical ORing function. Decode assignment register 62 may provide the control signal to logic circuit 66 by way of conductor 69. For example, decode assignment register 62 may program logic circuit 66 to perform an inversion of match signal 47 before performing a logical ANDing function. Thus, logic circuit 66 performs a logical ANDing function of the inversion of match signal 47 with match signal 53. Alternate embodiments of the present invention may use logic circuit 66 to perform any type of Boolean function, including a more complex function including more than two match signals. For example, logic circuit 66 may perform any combination of OR functions, AND functions, exclusive-OR functions, and NOT functions.

In an alternate embodiment of the present invention, the decode assignment register 62 may be located as one or more bit fields within each decoder 42, 48, and 54 (e.g. within address registers 44, 50, and 56, or within attribute registers 46, 52, and 58). Thus, bits within each decoder (e.g. 42) may be used to select which chip select signal that particular decoder (e.g. 42) will be assigned to. Note that in this embodiment, decoders 42, 48, and 54, rather than decode assignment register 62, will provide the required control signals to multiplexer 64 and logic circuits 66 and 68.

In an alternate embodiment of the present invention, the hardware functionality of multiplexer 64, decode assignment register 62, and logic circuits 66 and 68 may be combined together by way of a predetermined combination of logic gates so that the assignment of particular decoders to particular chip select signals is fixed in hardware, along with the logical operations, if any, performed on the match signals. Alternatively, only the decoder assignments may be fixed in hardware, while the logical operations may be programmable; or, the logical operations may be fixed in hardware, while the decoder assignments may be programmable, or any portion thereof may be fixed in hardware, while any portion thereof may be programmable.

Note that logic circuit 68 may be separately programmed by decode assignment register 62 to perform a different Boolean logic function than logic circuit 66. Timing control circuit 70 receives chip select control signals 71 and 73 and determines the appropriate time to assert chip select signals 72 and 74 and to provide them external to data processing system 10 by way of bus 28. Timing control circuit 70 may receive one or more control or clock signals (not shown) either from internal to data processing system 10 or from bus 28. Timing control circuit 70 may use these control or clock signals to determine the appropriate time to assert and negate chip select signals 72 and 74.

It is to be understood, therefore, that this invention is not limited to the particular forms illustrated and that the appended claims cover all modifications that do not depart from the spirit and scope of this invention.

I claim:

1. A data processing system (10) for using chip selects to perform a memory management function, comprising:
    a central processing unit (CPU) (12) for generating an address and an attribute sequentially for each of a plurality of memory accesses, in response to a program; and
    a chip select circuit (40) coupled to said CPU (12), comprising:
        a first decoder (42) having a first input for receiving said address, a second input for receiving said attribute, and an output for providing a first match signal (47) if said address is within a first region and said attribute matches a first protection attribute;
        a second decoder (48) having a first input for receiving said address, a second input for receiving said attribute, and an output for providing a second match signal (53) if said address is within a second region and said attribute matches a second protection attribute; and
        a logical operation circuit (60) having first and second inputs coupled to said outputs of said first (42) and second (48) decoders, respectively, and an output for providing a chip select control signal (71) for enabling a generation of an external chip select signal (72) for accessing an external device; and
        a control circuit, coupled to said logical operation circuit, said control circuit providing at least one control signal to said logical operation circuit in order to select which of said plurality of decode circuits are assigned to said chip select signal,
        whereby said chip select circuit (40) performs a Boolean function on the first and second match signals to produce a Boolean result, and whereby the Boolean result is used by said chip select circuit to determine if said chip select control signal is to be activated.

2. The data processing system of claim 1 wherein said logical operation circuit performs a logical OR operation between said outputs of said first and second decoders.

3. The data processing system of claim 1 wherein said external chip select signal comprises a chip enable signal.

4. The data processing system of claim 1 further comprising a timing control circuit having an input for receiving said chip select control signal, and an output for providing said external chip select signal according to a predetermined timing.

5. The data processing system of claim 1 wherein each of said first and second decoders comprises:
    an address register for storing a corresponding programmable address; and
    an attribute register for storing a corresponding programmable attribute.

6. The data processing system of claim 1 wherein said chip select circuit further comprises:
    a third decoder having a first input for receiving said address, a second input for receiving said attribute, and an output for providing a third match signal if said address is within a third region and said attribute matches a third protection attribute.

7. The data processing system (12) of claim 6 wherein said logical operation circuit (60) comprises:
    a multiplexer (64) having first, second, and third inputs respectively coupled to said outputs of said first (42), second (48), and third (54) decoders, a control input coupled to said control circuit, and first and second outputs (65), wherein said multiplexer (64) is responsive to said control circuit to selectively provide two of said outputs of said first, second, and third decoders as said first and second outputs (65) thereof; and
    a logic circuit (66) having first and second input coupled to said first and second outputs (65) of said multiplexer (64), and an output for providing said chip select control signal (71) according to said logic function.

8. A data processing system, comprising:
    a processor; and
    chip select circuitry, coupled to said processor;
    said chip select circuitry comprising:
        a plurality of decode circuits;
        a multiplexing circuit, coupled to said plurality of decode circuits;
        a control circuit for asserting and negating a chip select signal, said control circuit being coupled to said multiplexing circuit; and
        a decode assignment register, coupled to said multiplexing circuit, said decode assignment register providing at least one control signal to said multiplexing circuit in order to determine which one of said plurality of decode circuits is assigned to said chip select signal.

9. A data processing system as in claim 8, further comprising:
    a logic circuit, coupled between the multiplexing circuit and the control circuit, said logic circuit performing at least one Boolean function.

10. A data processing system as in claim 9, wherein the at least one Boolean function is a logical OR function.

11. A data processing system as in claim 9, wherein said plurality of decode circuits provide a plurality of match signals to said multiplexing circuit, and wherein said multiplexing circuit outputs selected ones of said plurality of match signals to said logic circuit.

12. A method for providing a plurality of chip select signals in a data processing system, the method comprising the steps of:
    storing a control value in a decode assignment register;
    determining, by way of the control value, which of a plurality of decode circuits are assigned to a first one of the plurality of chip select signals;
    determining, by way of the control value, which of the plurality of decode circuits are assigned to a second one of the plurality of chip select signals; and providing at least one of the first and second ones of the plurality of chip select signals external to the data processing system.

13. The method as in claim 12, wherein the decode assignment register is user programmable.

14. The method as in claim 12, further comprising the steps of:

storing a first address value in a first address register corresponding to a first one of the plurality of decode circuits;

storing a first attribute value in a first attribute register corresponding to the first one of the plurality of decode circuits;

initiating a bus cycle;

receiving a plurality of address signals and a plurality of attribute signals during the bus cycle;

comparing the first address value to at least a portion of the plurality of address signals to produce a first address match result;

comparing the first attribute value to at least a portion of the plurality of attribute signals to produce a first attribute match result;

if both the first address match result and the first attribute match result indicate matches, asserting a first match signal;

storing a second address value in a second address register corresponding to a second one of the plurality of decode circuits;

storing a second attribute value in a second attribute register corresponding to the second one of the plurality of decode circuits;

comparing the second address value to at least a portion of the plurality of address signals to produce a second address match result;

comparing the second attribute value to at least a portion of the plurality of attribute signals to produce a second attribute match result; and if both the second address match result and the second attribute match result indicate matches, asserting a second match signal.

15. The method as in claim 14, further comprising the step of:

if the control value has assigned both the first and second ones of the plurality of decode circuits to the first one of the plurality of chip select signals, performing a logical operation on the first and second match signals.

16. The method as in claim 14, wherein the at least a portion of the plurality of attribute signals include supervisor/user information.

17. The method as in claim 14, wherein the at least a portion of the plurality of attribute signals include program/data information.

18. The method as in claim 14, wherein the at least a portion of the plurality of attribute signals include read/write information.

19. The method as in claim 14, further comprising the step of:

if the control value has assigned both the first and second ones of the plurality of decode circuits to the first one of the plurality of chip select signals, asserting the first one of the plurality of chip select signals if the first and second match signals have a predetermined value.

20. The method as in claim 19, wherein the predetermined value is user programmable.

21. An integrated circuit comprising chip select circuitry, said chip select circuitry comprising:

a plurality of decode circuits;

a multiplexing circuit, coupled to said plurality of decode circuits;

a first control circuit for asserting and negating a chip select signal, said first control circuit being coupled to said multiplexing circuit; and a second control circuit, coupled to said multiplexing circuit, said second control circuit providing at least one control signal to said multiplexing circuit in order to determine which of said plurality of decode circuits are assigned to said chip select signal.

22. An integrated circuit as in claim 21, wherein said second control circuit comprises:

at least a portion of a user programmable register.

23. An integrated circuit as in claim 21, further comprising:

a processing unit, coupled to said chip select circuitry.

24. An integrated circuit as in claim 21, wherein the integrated circuit is a microcontroller.

25. An integrated circuit as in claim 21, further comprising:

a logic circuit, coupled between the multiplexing circuit and the first control circuit, said logic circuit performing at least one Boolean function.

26. An integrated circuit as in claim 25, wherein the at least one Boolean function is a logical OR function.

27. An integrated circuit as in claim 25, wherein said plurality of decode circuits provide a plurality of match signals to said multiplexing circuit, and wherein said multiplexing circuit outputs selected ones of said plurality of match signals to said logic circuit.

* * * * *